(12) United States Patent
Kim et al.

(10) Patent No.: US 11,791,539 B2
(45) Date of Patent: Oct. 17, 2023

(54) ANTENNA STRUCTURE AND DISPLAY DEVICE INCLUDING THE SAME

(71) Applicants: DONGWOO FINE-CHEM CO., LTD., Jeollabuk-do (KR); POSTECH RESEARCH AND BUSINESS DEVELOPMENT FOUNDATION, Gyeongsangbuk-do (KR)

(72) Inventors: Jong Min Kim, Gyeonggi-do (KR); Han Sub Ryu, Gyeongsangbuk-do (KR); Dong Pil Park, Incheon (KR); Won Bin Hong, Seoul (KR)

(73) Assignees: DONGWOO FINE-CHEM CO., LTD., Jeollabuk-do (KR); POSTECH RESEARCH AND BUSINESS DEVELOPMENT FOUNDATION, Gyeongsangbuk-do (KR)

( * ) Notice: Subject to any disclaimer, the term of this patent is extended or adjusted under 35 U.S.C. 154(b) by 524 days.

(21) Appl. No.: 17/140,599

(22) Filed: Jan. 4, 2021

(65) Prior Publication Data
US 2021/0126348 A1 Apr. 29, 2021

Related U.S. Application Data

(63) Continuation of application No. PCT/KR2019/008286, filed on Jul. 5, 2019.

(30) Foreign Application Priority Data

Jul. 5, 2018 (KR) .................. 10-2018-0078131

(51) Int. Cl.
*H01Q 1/38* (2006.01)
*H01Q 1/46* (2006.01)
(Continued)

(52) U.S. Cl.
CPC ............ *H01Q 1/243* (2013.01); *H01Q 1/38* (2013.01); *H01Q 1/46* (2013.01); *H04M 1/0277* (2013.01)

(58) Field of Classification Search
CPC ............ H01Q 1/24; H01Q 1/243; H01Q 1/38; H01Q 1/46; H01Q 9/0407; H05K 1/11; H05K 1/112; H05K 1/118; H05K 1/0224
See application file for complete search history.

(56) References Cited

U.S. PATENT DOCUMENTS

| 2006/0066487 A1* | 3/2006 | Park | H01Q 1/38 343/700 MS |
|---|---|---|---|
| 2006/0170597 A1* | 8/2006 | Kurashima | H01Q 1/242 343/795 |

(Continued)

FOREIGN PATENT DOCUMENTS

| CN | 203813017 U | 9/2014 |
|---|---|---|
| CN | 106384880 A | 2/2017 |

(Continued)

OTHER PUBLICATIONS

International Search Report for PCT/KR2019/008286 dated Oct. 11, 2019.

(Continued)

*Primary Examiner* — Thai Pham
(74) *Attorney, Agent, or Firm* — The PL Law Group, PLLC

(57) ABSTRACT

An antenna structure according to an embodiment of the present invention includes a film antenna including a dielectric layer, an upper electrode layer disposed on an upper surface of the dielectric layer and including a radiation pattern, a transmission line, and a ground pad, and a lower ground layer disposed on a lower surface of the dielectric layer, and a flexible circuit board including a core layer, a power supply wiring layer disposed on a lower surface of the (Continued)

core layer and electrically connected to the transmission line, and a ground plate disposed on an upper surface of the core layer and disposed in overlapping with the power supply wiring layer in a planar direction. Thereby, it is possible to reduce a radiation signal generated from the power supply wiring through the ground plate, suppress a noise of the antenna and increase radiation efficiency.

17 Claims, 12 Drawing Sheets

(51) Int. Cl.
*H05K 1/11* (2006.01)
*H01Q 1/24* (2006.01)
*H04M 1/02* (2006.01)

(56) References Cited

U.S. PATENT DOCUMENTS

| | | | |
|---|---|---|---|
| 2014/0145883 A1 | 5/2014 | Baks et al. | |
| 2019/0041907 A1* | 2/2019 | Kim | G06F 1/1616 |
| 2020/0194896 A1* | 6/2020 | Huh | B32B 7/12 |
| 2021/0141426 A1* | 5/2021 | Kim | H01Q 1/38 |

FOREIGN PATENT DOCUMENTS

| | | |
|---|---|---|
| JP | H 04349704 A | 12/1992 |
| JP | 2007-089109 A | 4/2007 |
| JP | 2017-175540 A | 9/2017 |
| KR | 10-2006-0088073 A | 8/2006 |
| KR | 10-2009-0065229 A | 6/2009 |
| KR | 10-2011-0080023 A | 7/2011 |
| KR | 10-2013-0079019 A | 7/2013 |
| KR | 10-2013-0095451 A | 8/2013 |
| KR | 10-2016-0027446 A | 3/2016 |
| KR | 10-2016-0080444 A | 7/2016 |
| KR | 10-2017-0020138 A | 2/2017 |
| KR | 10-2017-0100749 A | 9/2017 |
| WO | WO 2017/051649 A1 | 3/2017 |

OTHER PUBLICATIONS

Office action dated Apr. 13, 2020 from Korean Patent Office in a counterpart Korean Patent Application No. 10-2018-0078131 (all the cited references are listed in this IDS.) (English translation is also submitted herewith.).

* cited by examiner

ANTENNA STRUCTURE AND DISPLAY DEVICE INCLUDING THE SAME

PRIORITY

The present application is a continuation application to International Application No. PCT/KR2019/008286 with an International Filing Date of Jul. 5, 2019, which claims the benefit of Korean Patent Application No. 10-2018-0078131 filed on Jul. 5, 2018 at the Korean Intellectual Property Office, the disclosures of which are incorporated by reference herein in their entirety.

BACKGROUND

1. Technical Field

The present invention relates to an antenna structure and a display device including the same, and more particularly, to an antenna structure including electrodes and a dielectric layer, and a display device including the same.

2. Background Art

Recently, according to development of the information-oriented society, wireless communication techniques such as Wi-Fi, Bluetooth, and the like are implemented, for example, in a form of smartphones by combining with display devices. In this case, an antenna may be coupled to the display device to perform a communication function.

Recently, with mobile communication techniques becoming more advanced, it is necessary for an antenna for performing communication in ultrahigh frequency bands to be coupled to the display device.

In addition, as the display device on which the antenna is mounted becomes thinner and lighter, a space occupied by the antenna may also be reduced. Accordingly, there is a limit to simultaneously implementing the transmission and reception of high frequency and wideband signals within a limited space.

Therefore, it is necessary to apply an antenna to a thin display device in a form of a film or a patch, and in order to implement the above-described high frequency communication, research to secure reliability of radiation characteristics despite the thin structure is required.

For example, when supplying a power to the antenna through a power divider, unintended radiation may occur from a wire through which the power is distributed. Thereby, noise may occur, and radiation efficiency of the antenna may be decreased.

SUMMARY

An object of the present invention is to provide an antenna structure having improved signal efficiency and reliability.

Another object of the present invention is to provide a display device including the antenna structure having the improved signal efficiency and reliability.

To achieve the above objects, the following technical solutions are adopted in the present invention.

1. An antenna structure including: a film antenna including a dielectric layer, an upper electrode layer disposed on an upper surface of the dielectric layer and including a radiation pattern, a transmission line electrically connected to the radiation pattern, and a ground pad, and a lower ground layer disposed on a lower surface of the dielectric layer; and a flexible circuit board including a core layer, a power supply wiring layer disposed on a lower surface of the core layer and electrically connected to the transmission line of the film antenna, and a ground plate disposed on an upper surface of the core layer and disposed in overlapping with the power supply wiring layer in a planar direction.

2. The antenna structure according to the above 1, wherein one end of the transmission line is integrally connected with the radiation pattern, and the other end of the transmission line is provided as a signal pad, and the power supply wiring layer is electrically connected with the signal pad.

3. The antenna structure according to the above 2, wherein a pair of the ground pads are disposed by interposing the signal pad therebetween.

4. The antenna structure according to the above 1, wherein the power supply wiring layer of the flexible circuit board is disposed on the upper electrode layer of the film antenna.

5. The antenna structure according to the above 4, wherein the flexible circuit board further includes a ground contact which penetrates the core layer to be electrically connected with the ground pad of the film antenna.

6. The antenna structure according to the above 1, wherein the ground pad and the transmission line of the film antenna are bent along a side face of the dielectric layer and extend onto a lower surface of the dielectric layer.

7. The antenna structure according to the above 6, wherein the ground pad is integrally connected with the lower ground layer.

8. The antenna structure according to the above 6, wherein the ground plate of the flexible circuit board is disposed under the film antenna so as to be electrically connected with the ground pad of the film antenna.

9. The antenna structure according to the above 6, wherein the flexible circuit board further includes a power supply contact which penetrates the core layer to electrically connect the power supply wiring layer and the transmission line of the film antenna with each other.

10. The antenna structure according to the above 1, wherein the power supply wiring layer includes a plurality of power supply wirings, and the ground plate entirely covers the plurality of power supply wirings in a planar direction.

11. The antenna structure according to the above 1, wherein the power supply wiring layer of the flexible circuit board is disposed on an upper surface of the core layer, and the ground plate is disposed on a lower surface of the core layer.

12. The antenna structure according to the above 1, further including a circuit structure disposed on the flexible circuit board and configured to control power supply to the radiation pattern.

13. The antenna structure according to the above 12, wherein the flexible circuit board further includes a power supply via which penetrates the core layer to electrically connect the circuit structure and the power supply wiring layer with each other.

14. The antenna structure according to the above 12, wherein the circuit structure is disposed on a lower portion of the core layer of the flexible circuit board, so as to be electrically connected with the power supply wiring layer.

15. The antenna structure according to the above 1, wherein the radiation pattern includes a mesh structure.

16. The antenna structure according to the above 15, wherein the film antenna further includes a dummy mesh pattern disposed on the upper surface of the dielectric layer with being spaced apart from the radiation pattern.

17. A display device including the antenna structure according to the above 1.

In the antenna structure according to embodiments of the present invention, a ground plate may be formed on the power supply wiring layer of the flexible circuit board. Therefore, it is possible to reduce a radiation signal generated from the power supply wiring, and shield the radiation. Accordingly, radiation and signal reliabilities may be secured by preventing fluctuations in resonance frequency and disturbances in radiation characteristic of the radiation pattern, and radiation efficiency may be increased.

In some embodiments, by forming each member of the antenna structure including the radiation pattern in a mesh structure, transparency of the antenna structure may be improved, and it is possible to reduce the antenna structure from being viewed from an outside.

The antenna structure may be applied to a display device including a mobile communication device capable of transmitting and receiving signals in a high frequency or ultra-high frequency band of 3G, 4G, 5G or higher, and thereby improving optical characteristics such as radiation characteristics and transmittance.

DETAILED DESCRIPTION

Figure 1:
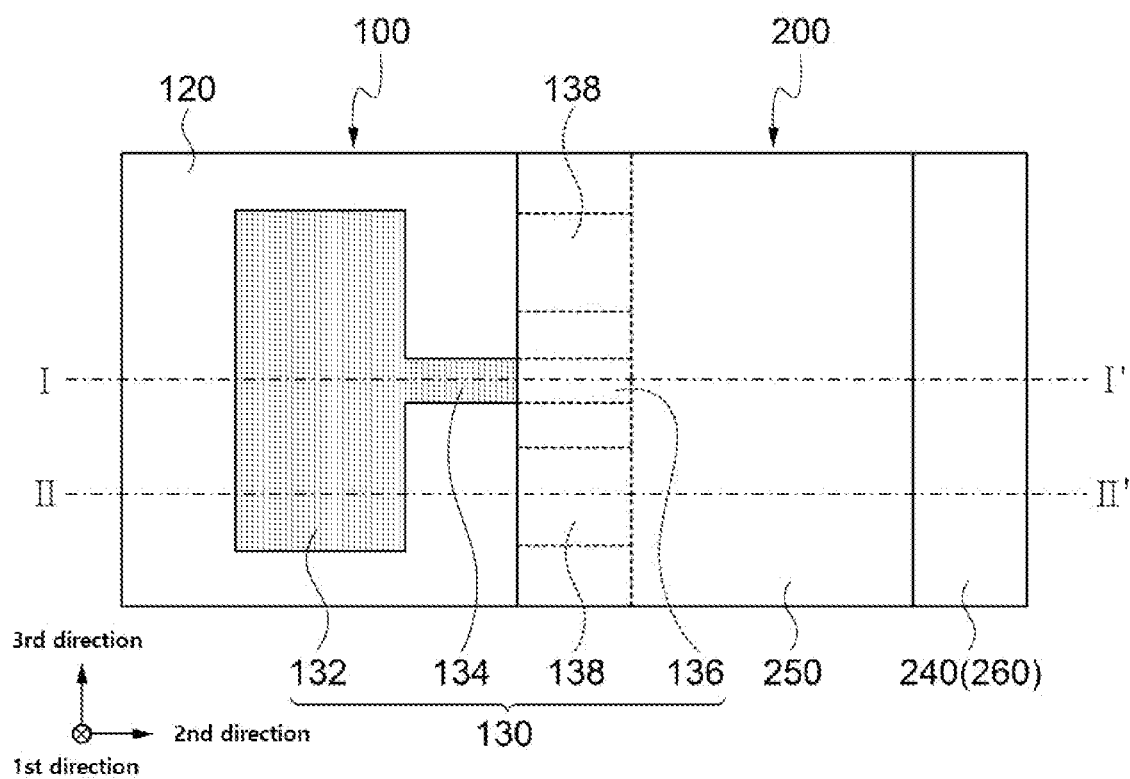
FIG. 1 is a schematic plan view illustrating an antenna structure according to exemplary embodiments.

An antenna structure according to embodiments of the present invention includes: a film antenna comprising a dielectric layer, an upper electrode layer disposed on an upper surface of the dielectric layer and including a radiation pattern, a transmission line, and a ground pad, and a lower ground layer disposed on a lower surface of the dielectric layer; and a flexible circuit board comprising a core layer, a power supply wiring layer disposed on a lower surface of the core layer and electrically connected to the transmission line, and a ground plate disposed on an upper surface of the core layer and disposed in overlapping with the power supply wiring layer in a planar direction. Thereby, it is possible to reduce a radiation signal generated from the power supply wiring through the ground plate, suppress a noise of the antenna and increase radiation efficiency.

The film antenna may be a microstrip patch antenna manufactured in a form of a transparent film, for example. The antenna structure may be applied to a communication device for 3G, 4G, or 5G mobile communication, for example. Further, embodiments of the present invention provide a display device including the antenna structure.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

Figure 2:
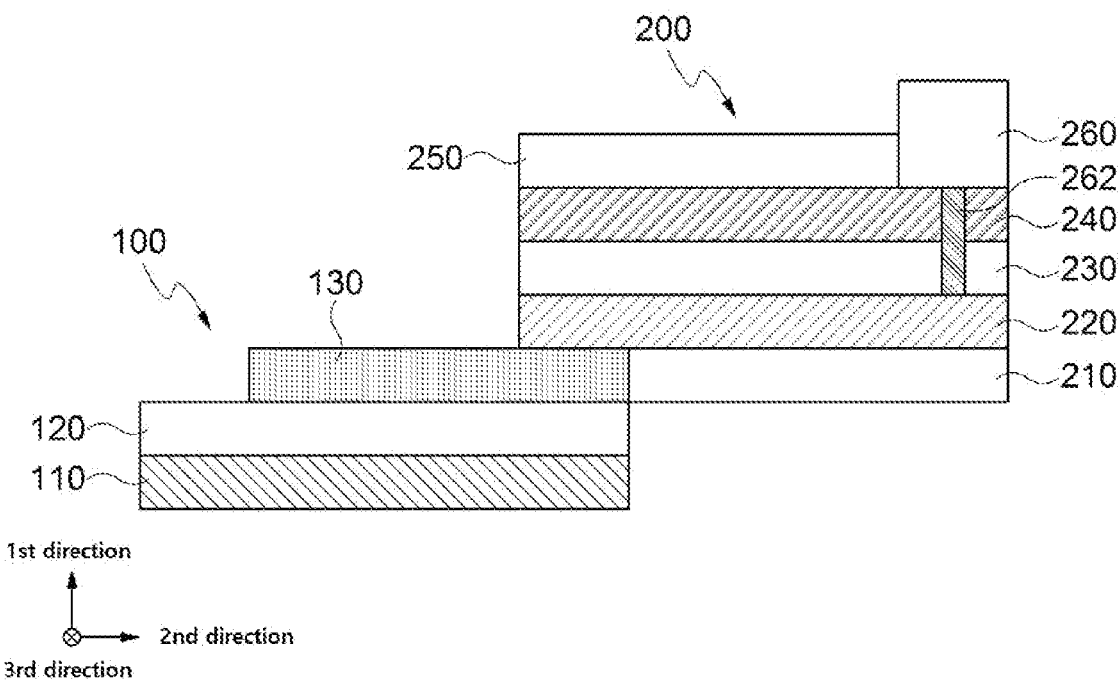
FIG. 2 is a schematic cross-sectional view illustrating a cross section taken on line I-I' of the antenna structure in FIG. 1.
Figure 3:
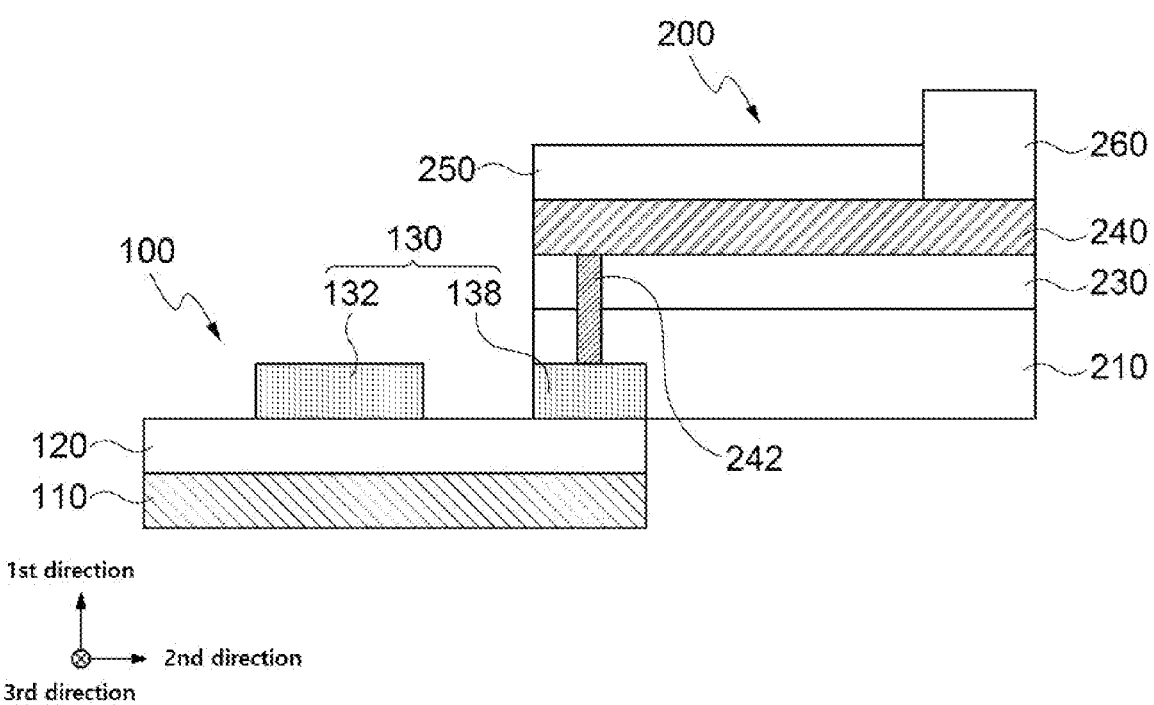
FIG. 3 is a schematic cross-sectional view illustrating a cross section taken on line II-II' of the antenna structure in FIG. 1.

In some embodiments, the flexible circuit board may be disposed on an upper surface of the film antenna. In addition, the power supply wiring layer of the flexible circuit board may be disposed on the upper electrode layer of the film antenna. FIGS. 1 to 3 are views of embodiments in which the power supply wiring layer is disposed on the upper electrode layer.

FIG. 1 is a schematic plan view illustrating an antenna structure according to exemplary embodiments, FIG. 2 is a schematic cross-sectional view illustrating a cross section taken on line I-I' of the antenna structure in FIG. 1, and FIG. 3 is a schematic cross-sectional view illustrating a cross section taken on line II-II' of the antenna structure in FIG. 1

Referring to FIGS. 1 to 3, the antenna structure may include a film antenna 100 and a flexible circuit board 200. The film antenna 100 may include a dielectric layer 120, an upper electrode layer 130, and a lower ground layer 110, and the flexible circuit board 200 may include a core layer 230, a ground plate 240, and a power supply wiring layer 220. The upper electrode layer 130 may include a radiation pattern 132, as well as a transmission line 134, a signal pad 136, and ground pads 138.

In FIG. 1, two directions which are parallel to the upper surface of the dielectric layer 120 and cross each other are defined as a second direction and a third direction. For example, the second and third directions may cross perpendicular to each other. A direction perpendicular to the upper surface of the dielectric layer 120 is defined as a first direction. For example, the first direction may correspond to a thickness direction of the antenna structure, the second direction may correspond to a length direction of the antenna structure, and the third direction may correspond to a width direction of the antenna structure. The definition of the directions may be equally applied to the remaining drawings.

The dielectric layer 120 may include, for example, a foldable transparent resin material having flexibility. For example, the dielectric layer 120 may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acryl resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; a polyimide resin such as nylon, aromatic polyimide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; an epoxy resin; a urethane or acrylic urethane resin, a silicone resin and the like. These may be used alone or in combination of two or more thereof.

In some embodiments, an adhesive film such as an optically clear adhesive (OCA), an optically clear resin (OCR), and the like may also be included in the dielectric layer 120.

In some embodiments, the dielectric layer 120 may include an inorganic insulation material such as silicon oxide, silicon nitride, silicon oxynitride, etc.

Capacitance or inductance may be generated between the upper electrode layer 130 and the lower ground layer 110 by the dielectric layer 120, thus to adjust a frequency band which can be driven or sensed by the film antenna. In some embodiments, a dielectric constant of the dielectric layer 120 may be adjusted in a range of about 1.5 to 12. When the dielectric constant exceeds about 12, a driving frequency is excessively reduced, such that driving of the antenna in a desired high frequency band may not be implemented.

The upper electrode layer 130 may be disposed on the upper surface of the dielectric layer 120. The upper electrode layer 130 may include the radiation pattern 132 of the film antenna, the transmission line 134 electrically connected to the radiation pattern 132, and the ground pads 138.

The radiation pattern 132 may transmit and receive radiation signals. One end of the transmission line 134 may be integrally connected with the radiation pattern 132, and may extend with being branched from the radiation pattern 132. For example, the transmission line 134 may extend from a central portion of the radiation pattern 132 toward the ground pads 138. In addition, the other end of the transmission line 134 may be provided as the signal pad 136. Further, the signal pad 136 or the transmission line 134 may be electrically connected with the power supply wiring layer 220. Accordingly, it is possible to receive an electric signal supplied to the radiation pattern 132 from the circuit structure 260.

The ground pads 138 may be disposed at an end portion of the transmission line 134 or around the signal pad 136. For example, the ground pad 138 may include a recess, and the end portion of the transmission line 134 or the signal pad 136 may be inserted into the recess. In an embodiment, the end portion of the transmission line 134 or the signal pad 136 may be disposed adjacent to the ground pad 138 in the recess with being spaced apart from the ground pad 138.

According to some embodiments, the transmission line 134 or the signal pad 136 may be disposed between a pair of ground pads.

As the ground pads 138 are disposed around the transmission line 134 or the signal pad 136, noise generated when receiving a radiation signal through the transmission line 134 or the signal pad 136 may be efficiently filtered or reduced.

The lower ground layer 110 may be disposed on the lower surface of the dielectric layer 120. According to exemplary embodiments, the lower ground layer 110 may be provided as a ground layer of the antenna structure.

As shown in FIGS. 1 to 3, the lower ground layer 110 may have an area larger than that of the upper electrode layer (e.g., the radiation pattern 132) on a plane. In some embodiments, lengths of the lower ground layer 110 in the second direction and the third direction may be greater than those of the upper electrode layer 130, respectively.

In an embodiment, a conductive member included in a display device including the antenna structure may be provided as a lower ground layer 110 (e.g., a ground layer).

The conductive member may include, for example, a gate electrode of a thin film transistor (TFT) included in the display panel, various wirings such as scan lines or data lines, or various electrodes such as pixel electrodes, common electrodes and the like.

The lower ground layer 110 may be electrically connected with the ground pad 138. For example, the ground pad 138 and the lower ground layer 110 may be electrically connected with each other by a conductive member which passes through the dielectric layer 120 (a contact or via structure) or by a conductive member which extends along a side face of the dielectric layer 120. Accordingly, noise or signal interference that may occur from the ground pad 138 can be grounded and removed through the lower ground layer 110. Therefore, reliable signal transmission and reception may be implemented without fluctuations in radiation characteristics such as a resonance frequency of the radiation pattern 132.

According to some embodiments, the ground pad 138 may extend along the side face of the dielectric layer 120 to be connected to the lower ground layer 110, and the ground pad 138 and the lower ground layer 110 may be integrally formed with each other. Therefore, compared to the case of forming contacts or vias in the dielectric layer, a thickness of the dielectric layer may be reduced, and thereby a reduction in the thickness of the antenna structure may be implemented.

The lower ground layer 110 may be overlapped so as to entirely cover the upper electrode layer 130 or the radiation pattern 132 on the plane. Accordingly, inductance formation efficiency through the dielectric layer 120 may be increased, and the grounding efficiency may be improved by being connected with the ground pad 138.

Referring to FIGS. 2 and 3, the flexible circuit board 200 may have a double-sided circuit board structure. According to exemplary embodiments, the flexible circuit board 200 may include the core layer 230, and the ground plate 240 and the power supply wiring layer 220 respectively formed on the upper and lower surfaces of the core layer 230. An upper coverlay film 250 and a lower coverlay film 210 for protecting the ground plate 240 and the power supply wiring layer 220 may be formed on the ground plate 240 and a surface of the power supply wiring layer 220 opposite to the core layer 230. In addition, the flexible circuit board 200 may further include a ground contact 242.

Furthermore, the flexible circuit board 200 may further include a power supply via 262 electrically connecting the circuit structure 260 and the power supply wiring layer 220, and the ground contact 242 electrically connecting the ground plate 240 and the ground pad 138.

The core layer 230 may include a resin material having flexibility, such as polyimide, epoxy resin, polyester, cyclo olefin polymer (COP), liquid crystal polymer (LCP) and the like.

In some exemplary embodiments, the power supply wiring layer 220 may be disposed on the upper electrode layer 130. Accordingly, a power supply wiring of the power supply wiring layer 220 and the transmission line 134 or the signal pad 136 of the upper electrode layer 130 may directly contact with each other to be electrically connected.

In some exemplary embodiments, the power supply wiring layer 220 may include a first power supply wiring 224 and a second power supply wiring 226, and may be disposed at the same level as the upper electrode layer 130. For example, the transmission line 134 or the signal pad 136 of the upper electrode layer 130 may contact with the first power supply wiring 224 to be electrically connected. The contact may include direct contact or contact achieved by interposing an anisotropic conductive film (ACF) at an interface therebetween.

Figure 4:
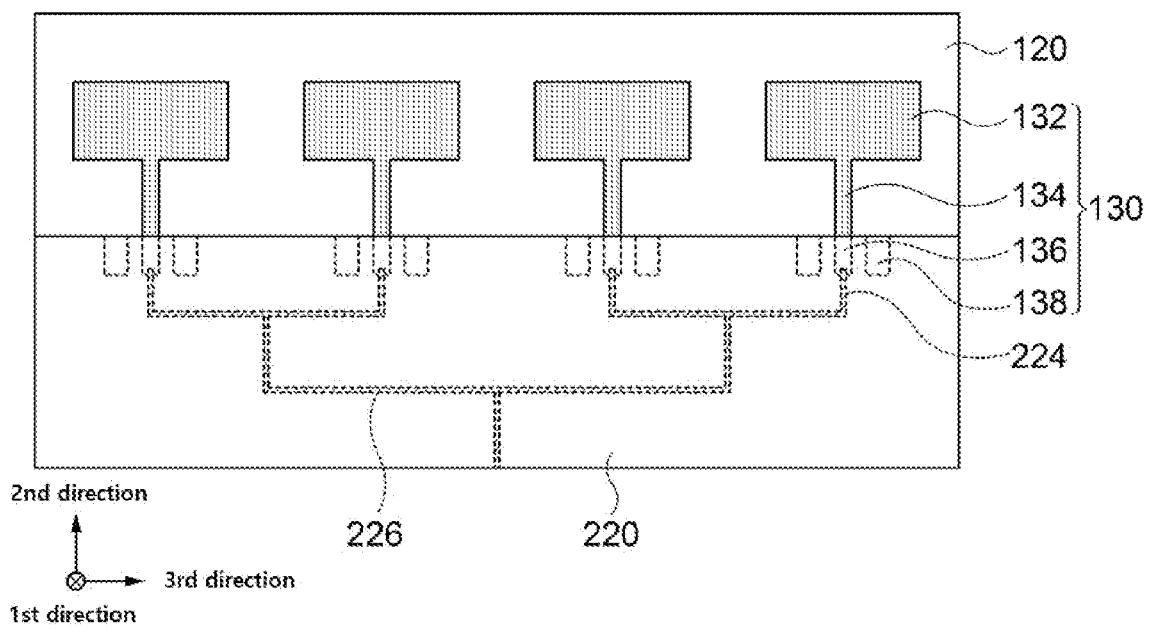
FIG. 4 is a schematic view illustrating an antenna structure according to exemplary embodiments.

FIG. 4 is a schematic plan view illustrating an antenna structure according to exemplary embodiments. Specifically, FIG. 4 is a schematic view illustrating a state in which the antenna structure is seen in a direction of the dielectric layer 120 from the upper surface of the power supply wiring layer 220.

Referring to FIG. 4, the antenna structure may include a plurality of radiation patterns 132 arranged on the upper surface of the dielectric layer 120, as well as a plurality of transmission lines 134, signal pads 136, and ground pads 138, which are respectively coupled with the radiation pattern. Accordingly, the plurality of radiation patterns 132, transmission lines 134, signal pads 136, and ground pads 138 may be arranged on the upper electrode layer 130.

The power supply wiring layer 220 may include the first power supply wiring 224 and the second power supply wiring 226.

In exemplary embodiments, the plurality of radiation patterns 132 may be coupled with one or multiple dielectric layers 120 and one or multiple lower ground layers 110 to form one or multiple film antennas 100.

According to exemplary embodiments, the power supply wirings 224 and 226 may be connected with the transmission lines 134 or the signal pads 136. Specifically, the power supply wirings may contact with the transmission lines 134 or the signal pads 136 to be electrically connected. Accordingly, the power supply wiring layer 220 may be electrically connected with the radiation patterns 132 through the transmission lines 134 or the signal pads 136. The power supply wiring may be provided as a power supply line through which an electric signal supplied from the circuit structure 260 is transferred to the radiation pattern 132.

In some embodiments, the first power supply wiring 224 may electrically connect a pair of adjacent radiation patterns 132 to couple or merge with each other. For example, the first power supply wiring 224 may electrically connect a pair of adjacent transmission lines 134 or signal pads 136 with each other.

In some embodiments, the second power supply wiring 226 may electrically connect a pair of adjacent first power supply wirings 224 to couple or merge with each other. The plurality of radiation patterns 132, transmission lines 134, and/or signal pads 136 formed on the upper electrode layer 130 may be connected with each other in the same way as described above. Accordingly, the plurality of radiation patterns 132 may be electrically connected to one power supply wiring layer 220.

In some embodiments, the plurality of radiation patterns 132 may form one film antenna 100 together with one dielectric layer 120 and one lower ground layer 110. In addition, the plurality of radiation patterns 132 may have different phases from each other. In this case, since an array antenna having a phase difference may be implemented through one lower ground layer 110, efficiency of signal transmission/reception may be improved.

In addition, for example, each of the ground pads 138 may be electrically connected with one or multiple lower ground layers 110 to reduce grounding and noise absorption resistances. The lower ground layer 110 may have a sufficient area to cover all the plurality of radiation patterns 132 on the plane. In addition, each of the ground pads 138 may be electrically connected with one or multiple ground plates 240 through the ground contacts 242.

In some embodiments, electrical connection between the power supply wiring layer 220 and the transmission lines 134 or the signal pads 136 may be performed by direct contact. Further, the electrical connection therebetween may be achieved by interposing the anisotropic conductive film (ACF) at an interface between the power supply wiring layer 220 and the transmission lines 134 or the signal pads 136.

The ground plate 240 is disposed on the upper surface of the core layer 230. The ground plate 240 may shield a radiation signal generated when electricity flows to the power supply wirings 224 and 226 of the power supply wiring layer 220. Accordingly, noise due to the radiation signal generated from the power supply wirings 224 and 226 may be suppressed, and radiation efficiency and reliability of the entire antenna may be improved.

According to some embodiments, the flexible circuit board 200 may further include the ground contact 242. The ground contact 242 passes through the core layer 230 and the power supply wiring layer 220 and may be made of a conductive member.

According to some embodiments, the ground plate 240 and the ground pad 138 may be electrically connected with each other by the ground contact 242. Accordingly, radiation signals generated from the power supply wirings 224 and 226 may be effectively shielded. In addition, the ground pad 138, the lower ground layer 110, and the ground plate 240 may be electrically connected with each other to form a ground composite. Accordingly, frequency of the antenna may be stably formed by the capacitance or inductance between the radiation pattern 132 and the ground composite.

According to some embodiments, the ground plate 240 may entirely cover the plurality of power supply wirings 224 and 226 in a planar direction of the power supply wiring layer 220. For example, the ground plate 240 may be overlapped on the entire area of the power supply wiring layer 220. For example, the ground plate 240 may have an area larger than the area of the power supply wiring layer 220, and may cover all the power supply wiring layer 220. Therefore, it is possible to effectively shield the radiation signal generated from the power supply wiring layer 220. According to some embodiments, the ground plate 240 may partially cover the plurality of power supply wirings 224 and 226 or the power supply wiring layer 220.

In some embodiments, lengths of the ground plate 240 in the second and third directions may be greater than the lengths of the power supply wiring layer 220 in the second and third directions, respectively. Accordingly, it is possible to cover the entire area of the power supply wiring layer 220 to suppress the radiation signal generated from the power supply wiring layer 220.

Figure 5:
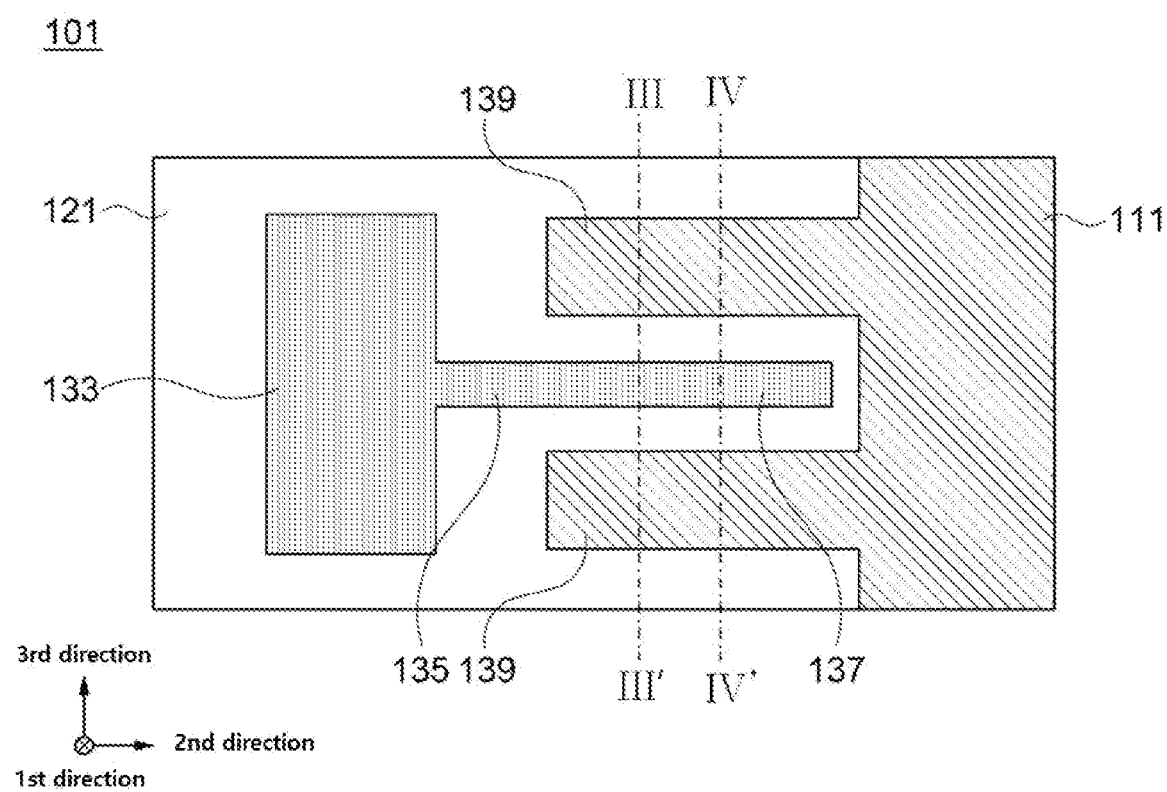
FIG. 5 is a schematic plan view illustrating a film antenna according to some embodiments before being folded along lines III-III' and IV-IV'.

FIG. 5 is a schematic plan view illustrating a film antenna according to some embodiments before being folded along lines III-III' and IV-IV'.

Referring to FIG. 5, the dielectric layer 121 may include a radiation pattern 133, a transmission line 135, a signal pad 137, a ground pad 139, and a lower ground layer 111, which are formed on an upper surface thereof. In addition, the dielectric layer 121 may be folded along lines III-III' and IV-IV' to form a film antenna 101.

In some embodiments, the ground pad 139 and the transmission line 135 may be bent along a side face of the dielectric layer 121 to extend onto a lower surface of the dielectric layer 121. Accordingly, a portion of the signal pad 137 and the ground pad 139 may be disposed on the lower surface of the dielectric layer 121 at the same level as the lower ground layer 111.

In addition, the ground pad 139 may be disposed to surround at least a portion of the transmission line 135 and the signal pad 137. In some embodiments, the ground pad 139 may be integrally connected with the lower ground layer 111.

In some embodiments, a flexible circuit board 201 may be disposed under the film antenna 101. FIGS. 6 to 9 are views illustrating a case in which the flexible circuit board 201 is provided on the lower surface of the lower ground layer 111.

Figure 6:
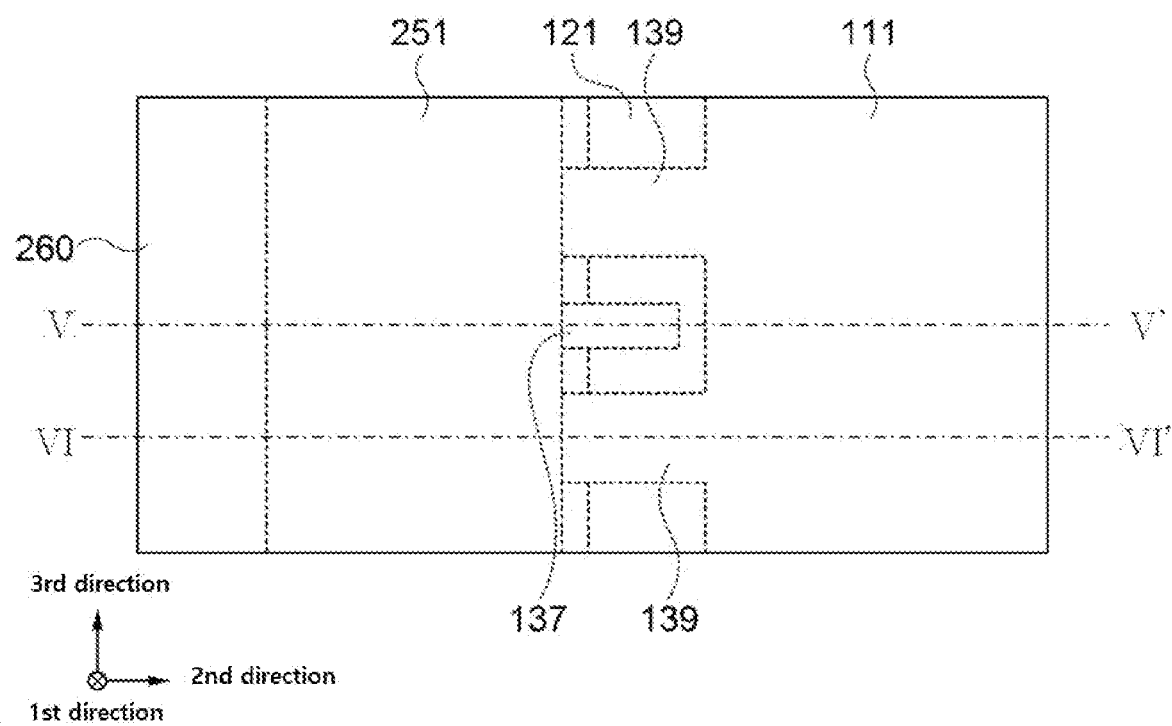
FIG. 6 is a schematic view illustrating an antenna structure according to some embodiments.
Figure 7:
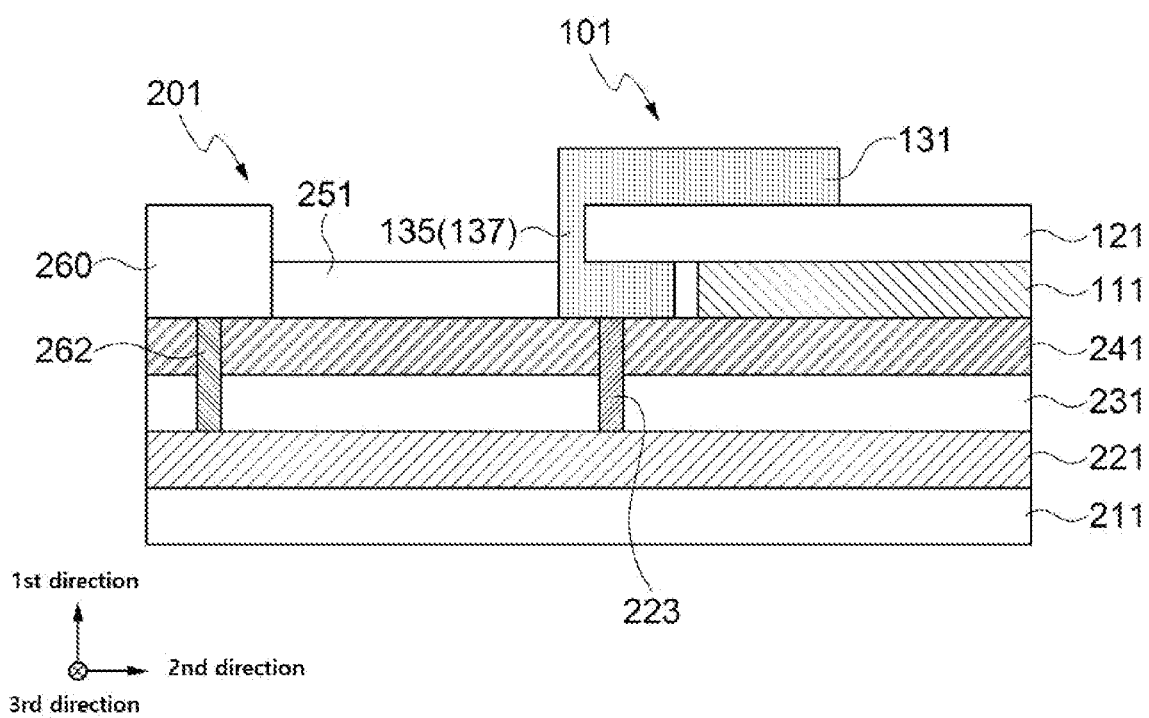
FIG. 7 is a schematic cross-sectional view illustrating a cross section taken on line V-V' of the antenna structure in FIG. 6.

FIG. 6 is a schematic view illustrating an antenna structure according to some embodiments. Specifically, FIG. is a view illustrating a state in which an interface between a ground plate 241, the lower ground layer 111, and an upper coverlay film 251, which abut each other, is seen from the lower surface of the antenna structure. FIG. 7 is a schematic cross-sectional view illustrating a cross section taken on line V-V' of the antenna structure in FIG. 6, and FIG. 8 is a schematic cross-sectional view illustrating a cross section taken on line VI-VI' of the antenna structure in FIG. 6.

Figure 8:
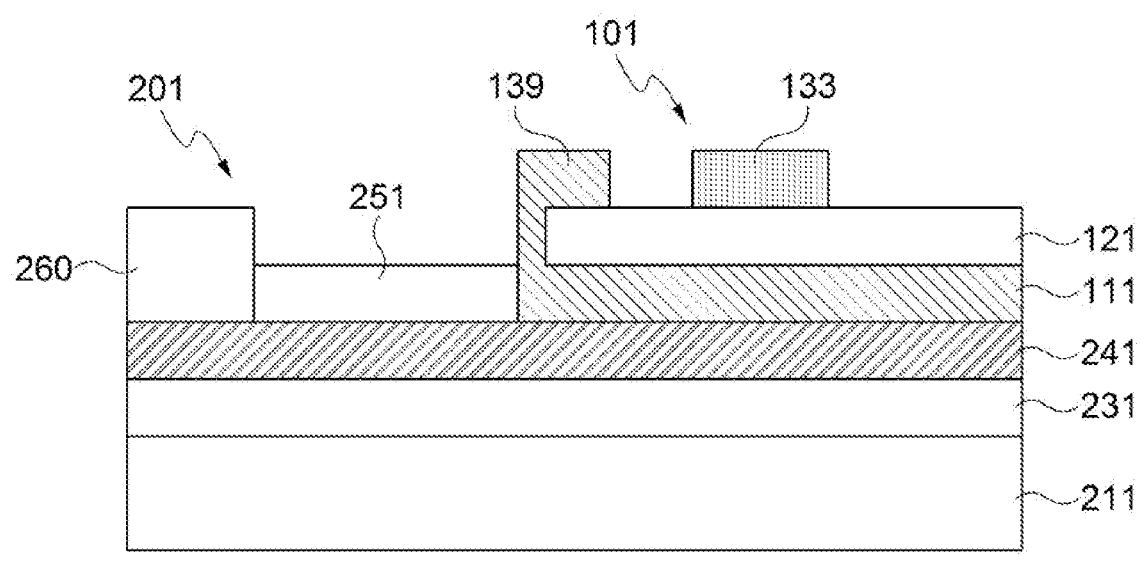
FIG. 8 is a schematic cross-sectional view illustrating a cross section taken on line VI-VI' of the antenna structure in FIG. 6.

Referring to FIGS. 6 to 8, the antenna structure may include the film antenna 101 and the flexible circuit board 201. The film antenna 101 may include: a dielectric layer 121; an upper electrode layer 131 disposed on an upper surface of the dielectric layer 121 and including a radiation pattern 133; a lower ground layer 111 disposed on a lower surface of the dielectric layer 121; a transmission line 135 which extends from the upper electrode layer 131 to the lower ground layer 111 by bending along a side face of the dielectric layer 121; and a ground pad 139. For example, the ground pad 139 may be integrally formed with the lower ground layer 111. In addition, the signal pad 137 may be formed on the lower surface of the dielectric layer 121 at the same level as the lower ground layer 111.

The flexible circuit board 201 may include a core layer 231, a power supply wiring layer 221 disposed on a lower surface of the core layer 231, and a ground plate 241 disposed on an upper surface of the core layer 231. In addition, the flexible circuit board 201 may further include a lower coverlay film 211 covering the power supply wiring layer 221, the upper coverlay film 251 covering the ground plate 241, and a power supply contact 223 electrically connecting the power supply wiring layer 221 and the signal pad 137 or the transmission line 135. The upper coverlay film 251 may at least partially contact with the ground pad 139 and the transmission line 135 or the signal pad 137.

The configurations and/or structures that are substantially the same as or similar to those described with reference to FIGS. 1 to 4 will not be described in detail.

Referring to FIGS. 7 and 8, the ground plate 241 may be disposed in contact with the lower ground layer 111. The ground plate 241 and the lower ground layer 111 may be electrically connected with each other by the contact. The contact may include direct contact, as well as a case of contact achieved by interposing the ACF at an interface therebetween.

Referring to FIG. 7, the power supply contact 223 may penetrate the core layer 231 to electrically connect the power supply wiring layer 221 and the transmission line 135 or the signal pad 137. The power supply contact 223 may penetrate not only the core layer 231 but also a portion of the ground plate 241. The power supply contact 223 may be made of a conductive member to conduct electricity. An electric signal path from the power supply wiring layer 221 to the radiation pattern 133 may be formed by the power supply contact 223.

In addition, in some embodiments, an insulation film may be formed around the power supply contact 223, or a hole or recess may be formed in a portion where the ground plate 241 and the power supply contact 223 abut each other, thus to block electrical contact between the ground plate 241 and the power supply contact 223. Accordingly, a short circuit of the power supply contact 223, the ground plate 241, and an entire circuit may be prevented.

Figure 9:
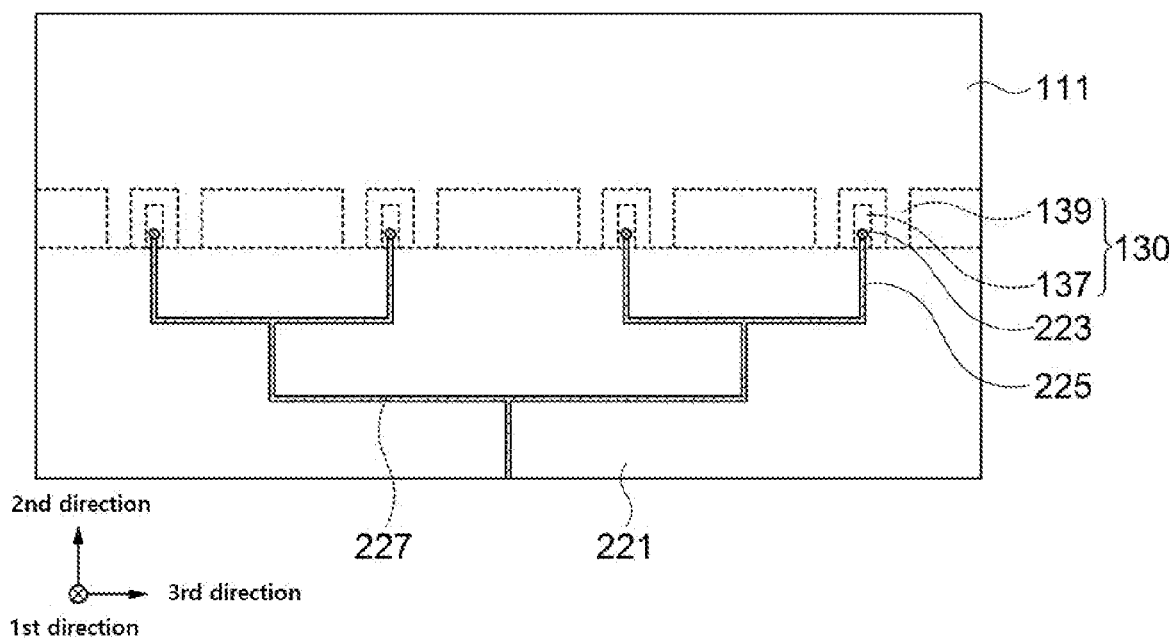
FIG. 9 is a schematic view illustrating an antenna structure according to some embodiments.

FIG. 9 is a schematic view illustrating an antenna structure according to some embodiments. Specifically, FIG. 9 is a view illustrating a state in which a connection of the flexible circuit board 201 and the film antenna 101 is seen from the power supply wiring layer 221.

Referring to FIG. 9, the film antenna 101 may include a lower ground layer 111 and a plurality of signal pads 137 and a plurality of ground pads 139 coupled to each of the signal pads 137. In addition, the plurality of ground pads 139 may be integrally formed with the lower ground layer 111. A flexible circuit board 201 may include a power supply contact 223, as well as a first power supply wiring 225 and a second power supply wiring 227 inside the power supply wiring layer 221.

In exemplary embodiments, the film antenna 101 may include a plurality of radiation patterns 133, each of which is 1:1 matched with the plurality of signal pads 137. When the plurality of radiation patterns 133 share one lower ground layer 111, an antenna having a phase difference may be implemented with one film antenna 101.

According to exemplary embodiments, the power supply wirings 225 and 227 may be connected with the transmission line 135 or the signal pad 137. For example, the power supply wiring layer 221 and the transmission line 135 may be connected with each other by the power supply contact 223. Specifically, a power supply wiring of the power supply wiring layer 221 may contact with the power supply contact 223, and the power supply contact 223 may contact with the transmission line 135 or the signal pad 137 to be electrically connected. Accordingly, an electrical connection from the power supply wiring layer 221 to the radiation pattern 133 may be formed through the transmission line 135. The contact may include direct contact and contact achieved by interposing the ACF at the interface therebetween.

In some embodiments, the first power supply wiring 225 may electrically connected a pair of adjacent radiation patterns 133 to couple or merge with each other. For example, a pair of adjacent transmission lines 135 or signal pads 137 may be electrically connected.

In some embodiments, the second power supply wiring 227 may electrically connect a pair of adjacent first power supply wirings 225 to couple or merge with each other. A plurality of radiation patterns 133, transmission lines 135, and/or signal pads 137 formed on the upper electrode layer 131 may be connected with each other in the same way as described above. Accordingly, the plurality of radiation patterns 133 may be electrically connected with one power supply wiring layer 221.

According to some embodiments, the ground plate 241 may contact with the lower ground layer 111 to be electrically connected. For example, the ground plate 241 may directly contact with the lower ground layer 111. In addition, the ground plate 241 and the lower ground layer 111 may be electrically connected by interposing the ACF at the interface therebetween. Accordingly, the ground plate 241 and the lower ground layer 111 may form a ground composite.

According to some embodiments, the ground plate 241 may entirely cover the plurality of power supply wirings 225 and 227 in a planar direction of the power supply wiring layer 221. For example, the ground plate 241 may be overlapped on the entire area of the power supply wiring layer 221. For example, the ground plate 241 may have an area larger than the area of the power supply wiring layer 221 and cover all the power supply wiring layers 221. Therefore, it is possible to effectively shield the radiation signal generated from the power supply wiring layer 221. According to some embodiments, the ground plate 241 may partially cover the plurality of power supply wirings 225 and 227 or the power supply wiring layer 221.

In some embodiments, lengths of the ground plate 241 in the second and third directions may be greater than the lengths of the power supply wiring layer 221 in the second and third directions, respectively. Accordingly, it is possible to cover the entire area of the power supply wiring layer 221 to suppress the radiation signal generated from the power supply wiring layer 221.

In some embodiments, the upper electrode layers 130 and 131, the lower ground layers 110 and 111, and the ground plates 240 and 241 may include conductive materials which are the same as or different from each other.

For example, the upper electrode layers 130 and 131, the lower ground layers 110 and 111, and the ground plates 240 and 241 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy including at least one thereof. These may be used alone or in combination of two or more thereof.

For example, the upper electrode layers 130 and 131, the lower ground layers 110 and 111, and the ground plates 240 and 241 may include silver (Ag) or a silver alloy to implement low resistance. For example, it is possible to include a silver-palladium-copper (APC) alloy.

In an embodiment, the upper electrode layers 130 and 131, the lower ground layers 110 and 111, and the ground plates 240 and 241 may include copper (Cu) or a copper alloy to implement a low resistance and fine line width pattern.

For example, the upper electrode layers 130 and 131 may include a copper-calcium (Cu—Ca) alloy.

In some embodiments, the upper electrode layers 130 and 131, the lower ground layers 110 and 111, and the ground plates 240 and 241 may include different conductive materials from each other. For example, the upper electrode layers 130 and 131 and the ground plates 240 and 241 may include the above-described metals or alloys, and the lower ground layers 110 and 111 may include a transparent conductive oxide such as indium tin oxide (ITO), indium zinc oxide (IZO), indium zinc tin oxide (IZTO), or zinc oxide (ZnOx).

For example, the upper electrode layers 130 and 131 may have a three-layer structure of a transparent conductive oxide layer-metal layer-transparent conductive oxide layer. In this case, resistance may be reduced while improving flexible properties by the metal layer, and corrosion resistance and transparency may be improved by the transparent conductive oxide layer.

Referring to FIGS. 2 and 7, the circuit structure 260 may be disposed on the flexible circuit boards 200 and 201. For example, the circuit structure 260 is a connection part (e.g., a connector) which electrically connects the flexible circuit boards 200 and 201 with another circuit board (e.g., a main board of an image display device), or an integrated circuit chip for driving the antenna.

For example, the circuit structure 260 may be electrically connected with the power supply wiring layers 220 and 221 through circuits or wirings (e.g., power supply via 262) included in the flexible circuit boards 200 and 201 to perform power supply. An electric signal supplied from the circuit structure 260 may be supplied to the transmission lines 134 and 135, the signal pads 136 and 137, and the ground pads 138 and 139 through the power supply wiring layers 220 and 221. Accordingly, the electric signal may be supplied to the radiation patterns 132 and 133 from the circuit structure 260 through the power supply via 262, the power supply wiring layers 220 and 221, and the transmission lines 134 and 135, and the power supply to the radiation patterns 132 and 133 may be controlled by the circuit structure 260.

In addition, in some embodiments, an insulation film may be formed around the power supply via 262, or a hole or recess may be formed in a portion where the ground plate 241 and the power supply via 262 abut each other, thus to block electrical contact between the ground plate 241 and the power supply via 262. Accordingly, a short circuit of the power supply via 262, the ground plate 241, and the entire circuit may be prevented.

In some embodiments, the circuit structure 260 may be disposed under the core layers 230 and 231 of the flexible circuit boards 200 and 201, so as to be electrically connected with the power supply wiring layers 220 and 221. For example, the circuit structure 260 may be disposed in direct contact with the power supply wiring layers 220 and 221, and may be electrically connected therewith by direct contact. In addition, an electrical connection may be performed by interposing the ACF, etc. at the contact interface therebetween.

In addition, the circuit structure 260 may not directly contact with the power supply wiring layers 220 and 221. In this case, the circuit structure 260 and the power supply wiring layers 220 and 221 may be connected with each other through a separate connection line for electrically connecting the circuit structure 260 and the power supply wiring layers 220 and 221.

In some embodiments, the ground plates 240 and 241 of the flexible circuit boards 200 and 201 may be disposed on the lower surfaces of the core layers 230 and 231, and the power supply wiring layers 220 and 221 may be disposed on the upper surfaces of the core layers 230 and 231. That is, in the flexible circuit boards 200 and 201, positions of the ground plates 240 and 241 and the power supply wiring layers 220 and 221 may be exchanged with each other.

In addition, for example, when the flexible circuit board 200 is connected to an upper portion of the film antenna 100, a second power supply contact which connects the power supply wiring layer 220 and the transmission line 134 or the signal pad 136 may be provided, and the ground plate 240 may directly contact with the ground pad 139. Thus, the ground contact 242 may be omitted.

Further, when the flexible circuit board 201 is connected to a lower portion of the film antenna 101, the power supply wiring layer 221 may directly contact with the transmission line 135 or the signal pad 137. Thus, the power supply contact 223 may be omitted.

In addition, for example, the ground plate 241 may have a second ground contact to be connected with the ground pad 139. When the positions of the ground plates 240 and 241 and the power supply wiring layers 220 and 221 are changed from each other, among the radiation signals generated from the power supply wiring layers 220 and 221, a radiation signal directed toward the lower surface of the antenna may be shielded.

Figure 10:
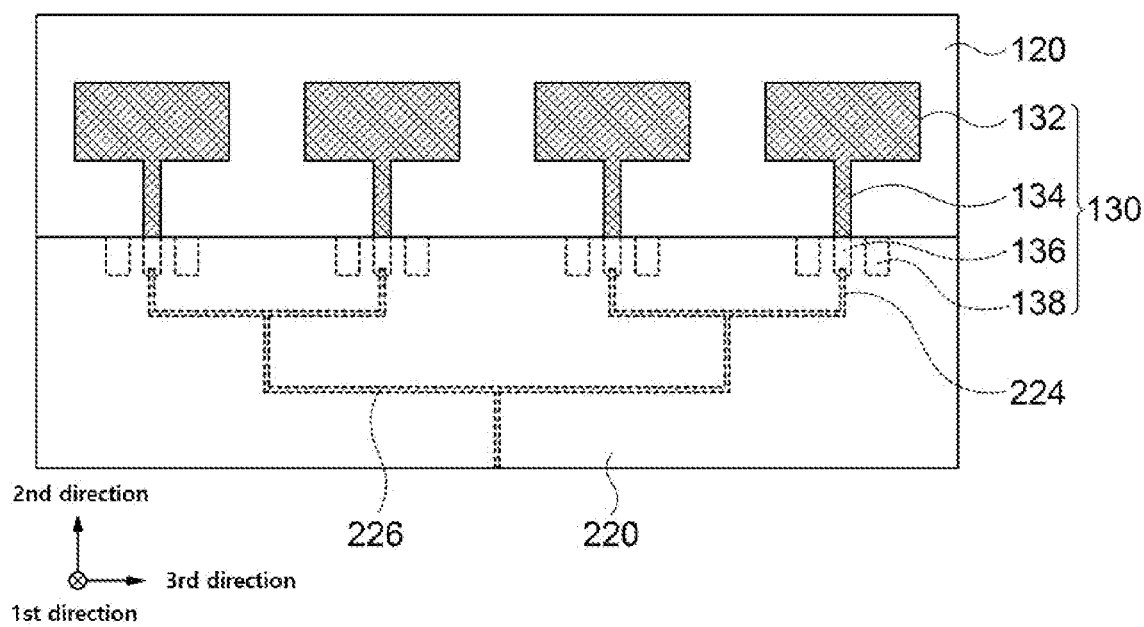
FIGS. 10 and 11 are schematic plan views illustrating antenna structures according to some embodiments.
Figure 11:
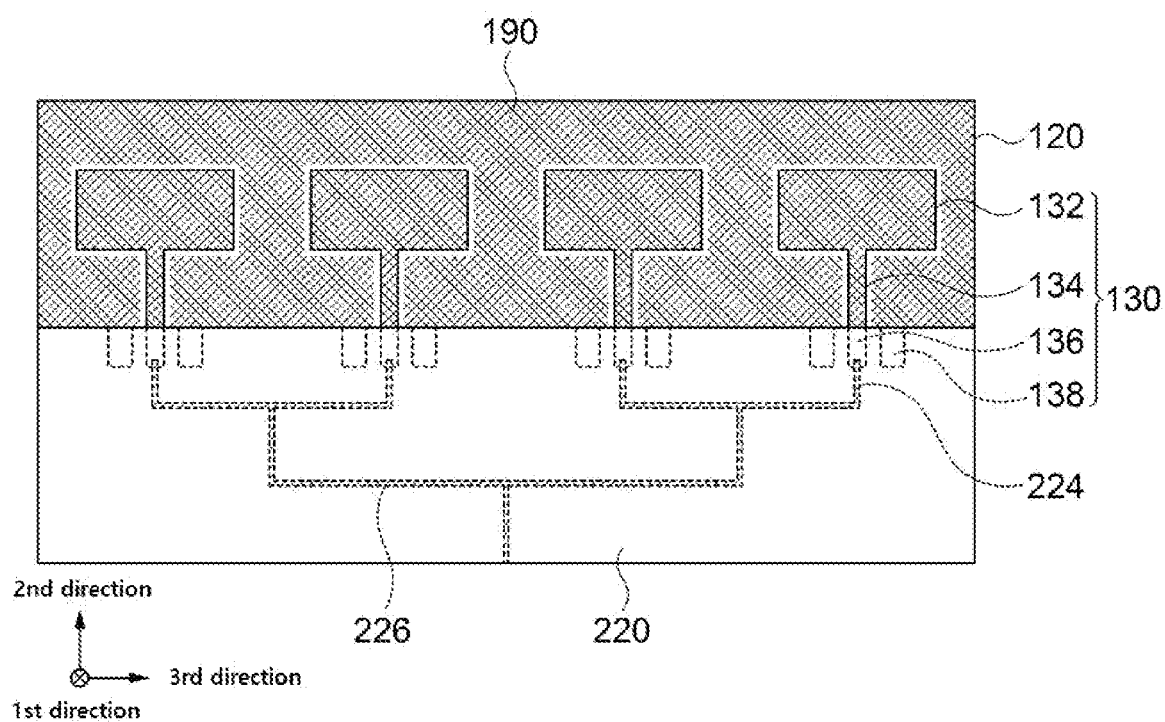

FIGS. 10 and 11 are schematic plan views illustrating antenna structures according to some embodiments. Referring to FIGS. 10 and 11, a radiation pattern 132 may include a mesh structure, and a dummy mesh pattern 190 may be further included around the radiation pattern 132. The configurations that are the same as or similar to those described with reference to FIGS. 1 to 4 will not be described in detail.

According to some embodiments, an upper electrode layer 130 of the antenna structure may include a mesh structure. According to exemplary embodiments, a radiation pattern 132 may include a mesh structure, and thus to improve transmittance of the antenna structure. In addition, according to some embodiments, the lower ground layer 110 may also include a mesh structure. Accordingly, the transmittance of the antenna structure may be more improved.

The dummy mesh pattern 190 may be disposed on a dielectric layer 120 around the radiation pattern 132. The dummy mesh pattern 190 and the radiation pattern 132 may include substantially the same form of mesh structure as each other. The dummy mesh pattern 190 may allow the electrode array around the radiation pattern 132 to be uniform, thus to prevent the mesh structure or the electrode line included therein from being viewed by a user of the display device to which the antenna structure is applied.

For example, a mesh metal layer may be formed on the dielectric layer 120, and the mesh metal layer may be cut along a predetermined area to electrically and physically separate the dummy mesh pattern from the radiation pattern.

In some embodiments, the transmission line 134, the signal pad 136, the ground pad 138 and/or the lower ground layer 110 of the upper electrode layer 130 may also include the mesh structure.

In some embodiments, not only when the flexible circuit board 200 is provided on the upper portion of the film antenna 100 as shown in FIGS. 10 and 11, but also when the flexible circuit board 201 is provided on the lower portion of the film antenna 101, the mesh structure may be formed in the same form as each other. Accordingly, the radiation pattern 133, the transmission line 135, the signal pad 137, the ground pad 139, and the lower ground layer 111 may include a mesh structure, and the dummy mesh pattern may be arranged around the radiation pattern 133 with being spaced apart from the radiation pattern 133. In addition, the power supply wiring layer 221 and the ground plate 241 of the flexible circuit board 201 may also include the mesh structure.

For example, a configuration including the mesh structure (e.g., the radiation pattern 133 and the transmission line 135) may include a mesh structure in a region including an edge portion of the corresponding configuration (not illustrated).

For example, the configuration including the mesh structure may not include the mesh structure in the edge portion of the corresponding configuration.

The edge portion may mean, for example, an outermost portion of the configuration including the mesh structure.

Figure 12:
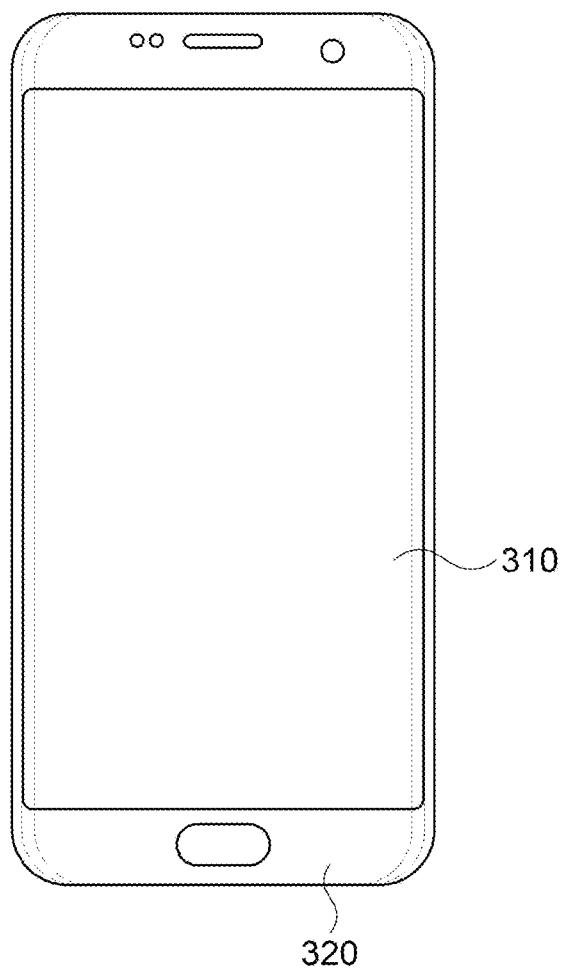
FIG. 12 is a schematic plan view illustrating a display device according to exemplary embodiments.

FIG. 12 is a schematic plan view illustrating an image display device according to exemplary embodiments. For example, FIG. 12 shows an external shape including a window of the display device.

Referring to FIG. 12, a display device 300 may include a display region 310 and a peripheral region 320. The peripheral region 320 may be disposed on both sides and/or both ends of the display region 310, for example.

In some embodiments, the above-described antenna structure may be inserted into the peripheral region 320 of the display device 300 in a form of a patch. In some embodiments, the radiation pattern and the lower ground layer of the antenna structure may be disposed so as to be at least partially overlapped with the display region 310. For example, it is possible to reduce the radiation pattern from being viewed to a user by using the mesh structure.

The peripheral region 320 may correspond to a light-shielding part or a bezel part of the image display device, for example. An integrated circuit (IC) chip for controlling driving characteristics and radiation characteristics of the antenna structure and supplying a power supply signal may be disposed in the peripheral region 320.

What is claimed is:

1. An antenna structure comprising:
   a film antenna comprising:
   a dielectric layer;
   an upper electrode layer disposed on an upper surface of the dielectric layer, the upper electrode layer comprising a radiation pattern, a transmission line electrically connected to the radiation pattern, and a ground pad; and
   a lower ground layer disposed on a lower surface of the dielectric layer; and
   a flexible circuit board comprising:
   a core layer;
   a power supply wiring layer disposed on a lower surface of the core layer and electrically connected to the transmission line of the film antenna; and
   a ground plate disposed on an upper surface of the core layer and disposed in overlapping with the power supply wiring layer in a planar direction.

2. The antenna structure according to claim 1, wherein one end of the transmission line is integrally connected with the radiation pattern, and the other end of the transmission line is provided as a signal pad; and
   the power supply wiring layer is electrically connected with the signal pad.

3. The antenna structure according to claim 2, wherein a pair of the ground pads are disposed by interposing the signal pad therebetween.

4. The antenna structure according to claim 1, wherein the power supply wiring layer of the flexible circuit board is disposed on the upper electrode layer of the film antenna.

5. The antenna structure according to claim 4, wherein the flexible circuit board further comprises a ground contact which penetrates the core layer to be electrically connected with the ground pad of the film antenna.

6. The antenna structure according to claim 1, wherein the ground pad and the transmission line of the film antenna are bent along a side face of the dielectric layer and extend onto a lower surface of the dielectric layer.

7. The antenna structure according to claim 6, wherein the ground pad is integrally connected with the lower ground layer.

8. The antenna structure according to claim 6, wherein the ground plate of the flexible circuit board is disposed under the film antenna so as to be electrically connected with the ground pad of the film antenna.

9. The antenna structure according to claim 6, wherein the flexible circuit board further comprises a power supply contact which penetrates the core layer to electrically connect the power supply wiring layer and the transmission line of the film antenna with each other.

10. The antenna structure according to claim 1, wherein the power supply wiring layer includes a plurality of power supply wirings, and the ground plate entirely covers the plurality of power supply wirings in the planar direction.

11. The antenna structure according to claim 1, wherein the power supply wiring layer of the flexible circuit board is disposed on an upper surface of the core layer, and the ground plate is disposed on a lower surface of the core layer.

12. The antenna structure according to claim 1, further comprising a circuit structure disposed on the flexible circuit board and configured to control power supply to the radiation pattern.

13. The antenna structure according to claim 12, wherein the flexible circuit board further comprises a power supply via which penetrates the core layer to electrically connect the circuit structure and the power supply wiring layer with each other.

14. The antenna structure according to claim 12, wherein the circuit structure is disposed on a lower portion of the core layer of the flexible circuit board, so as to be electrically connected with the power supply wiring layer.

15. The antenna structure according to claim 1, wherein the radiation pattern comprises a mesh structure.

16. The antenna structure according to claim 15, wherein the film antenna further comprises a dummy mesh pattern disposed on the upper surface of the dielectric layer with being spaced apart from the radiation pattern.

17. A display device comprising the antenna structure according to claim 1.

* * * * *